US008805972B1

(12) United States Patent
Merkulov et al.

(10) Patent No.: US 8,805,972 B1
(45) Date of Patent: Aug. 12, 2014

(54) MULTI-PLATFORM OPERATIONAL OBJECTIVE CONFIGURATOR FOR COMPUTING DEVICES

(71) Applicant: Kaspersky Lab ZAO, Moscow (RU)

(72) Inventors: Petr S. Merkulov, Moscow (RU); Victor F. Dronov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/928,125

(22) Filed: Jun. 26, 2013

(51) Int. Cl.
*G06F 15/177* (2006.01)
*G08B 23/00* (2006.01)
*H04L 29/06* (2006.01)
*G06F 21/57* (2013.01)

(52) U.S. Cl.
CPC .............. *H04L 29/06* (2013.01); *G06F 21/577* (2013.01); *H04L 63/1433* (2013.01)
USPC ........... 709/220; 709/221; 709/222; 709/223; 726/22; 726/25

(58) Field of Classification Search
USPC .............. 709/220–223, 227–229; 726/22–25
See application file for complete search history.

(56) References Cited

U.S. PATENT DOCUMENTS

| | | | |
|---|---|---|---|
| 6,070,244 A | 5/2000 | Orchier et al. | |
| 6,088,801 A * | 7/2000 | Grecsek ............................ 726/1 |
| 6,279,030 B1 * | 8/2001 | Britton et al. ................. 709/203 |
| 6,701,521 B1 * | 3/2004 | McLlroy et al. ............... 717/173 |
| 6,973,653 B1 * | 12/2005 | Fairman et al. ............... 718/104 |
| 7,293,087 B2 * | 11/2007 | Styles et al. ................... 709/224 |
| 7,478,416 B2 | 1/2009 | Edson | |
| 7,516,480 B2 | 4/2009 | Pearson et al. | |
| 7,596,620 B1 | 9/2009 | Colton et al. | |
| 7,792,661 B1 * | 9/2010 | Cooley et al. ................. 702/185 |
| 7,805,495 B2 | 9/2010 | Marmaos | |
| 7,831,734 B2 | 11/2010 | Bernhard et al. | |
| 7,877,804 B2 | 1/2011 | Khanolkar et al. | |
| 7,912,929 B2 | 3/2011 | Styles | |
| 7,937,696 B2 * | 5/2011 | Blossom et al. ............... 717/168 |
| 7,945,955 B2 | 5/2011 | Katkar et al. | |
| 7,996,610 B2 | 8/2011 | Wan et al. | |
| 8,086,582 B1 | 12/2011 | Wills et al. | |

(Continued)

OTHER PUBLICATIONS

Jon Oberheide, Kausihik Veerraghavan, Evan Cooke, Jason Flinn and Farmam Jahanian: "Virtualized in-cloud services for mobile devices", Proceedings of the 1st workshop on virtualization in Mobile Computing, ACM, 2008, pp. 31-35.*

(Continued)

*Primary Examiner* — Catherine Thiaw
(74) *Attorney, Agent, or Firm* — Patterson Thuente Pedersen, PA

(57) ABSTRACT

Application configuration settings are managed for a plurality of diverse computing devices having different resources including independent applications. An operational objective defining certain behaviors for a plurality of applications executable computing devices is received via a user input. Configuration and resource information is obtained for each computing device. A determination is made of applications on each of the computing devices for which the specified operational objective can be at least partially achieved. The determination is based on the user input, on the configuration and resource information for each of the computing devices, and on a predefined set of resource mappings that defines requirements for meeting various operational objectives and resources needed for meeting each of the requirements. Configuration instructions particularized to one or more of the computing devices is generated in response to the determination that the operational objective can be at least partially achieved.

22 Claims, 12 Drawing Sheets

(56) References Cited

U.S. PATENT DOCUMENTS

| | | | |
|---|---|---|---|
| 8,117,317 B2 | 2/2012 | Klimentiev et al. | |
| 8,316,357 B2 | 11/2012 | Mosier et al. | |
| 8,473,598 B1* | 6/2013 | Piper | 709/223 |
| 8,631,492 B2* | 1/2014 | Yablokov | 726/22 |
| 2002/0032754 A1* | 3/2002 | Logston et al. | 709/219 |
| 2003/0208569 A1* | 11/2003 | O'Brien et al. | 709/221 |
| 2006/0173979 A1* | 8/2006 | Roellgen | 709/221 |
| 2007/0198664 A1* | 8/2007 | Satkunanathan et al. | 709/220 |
| 2008/0183848 A1* | 7/2008 | Zilbershtein et al. | 709/222 |
| 2008/0276295 A1* | 11/2008 | Nair | 726/1 |
| 2009/0024992 A1 | 1/2009 | Kulaga | |
| 2009/0068980 A1* | 3/2009 | Creswell et al. | 455/405 |
| 2009/0094670 A1 | 4/2009 | Park | |
| 2009/0320019 A1* | 12/2009 | Ellington et al. | 717/177 |
| 2010/0050172 A1* | 2/2010 | Ferris | 718/1 |
| 2010/0169497 A1* | 7/2010 | Klimentiev et al. | 709/228 |
| 2010/0228836 A1* | 9/2010 | Lehtovirta et al. | 709/220 |
| 2010/0234009 A1 | 9/2010 | Antani et al. | |
| 2011/0004565 A1* | 1/2011 | Stephenson et al. | 705/348 |
| 2011/0022653 A1 | 1/2011 | Werth et al. | |
| 2011/0035287 A1* | 2/2011 | Fox | 705/14.69 |
| 2011/0179151 A1* | 7/2011 | Sedukhin et al. | 709/221 |
| 2011/0289585 A1* | 11/2011 | Zaitsev | 726/24 |
| 2011/0295387 A1 | 12/2011 | Um et al. | |
| 2012/0036245 A1* | 2/2012 | Dare et al. | 709/223 |
| 2012/0047569 A1* | 2/2012 | Wang | 726/11 |
| 2012/0150796 A1 | 6/2012 | Martick | |
| 2012/0159633 A1* | 6/2012 | Grachev et al. | 726/24 |
| 2012/0278892 A1* | 11/2012 | Turbin | 726/24 |
| 2012/0297041 A1* | 11/2012 | Momchilov | 709/223 |
| 2012/0311144 A1* | 12/2012 | Akelbein et al. | 709/224 |
| 2013/0067461 A1* | 3/2013 | Taragin et al. | 717/176 |
| 2013/0080608 A1* | 3/2013 | Breh et al. | 709/221 |
| 2013/0125208 A1* | 5/2013 | Doukhvalov et al. | 726/3 |
| 2013/0159476 A1* | 6/2013 | Hilburn et al. | 709/220 |
| 2013/0166712 A1* | 6/2013 | Chandramouli et al. | 709/223 |
| 2014/0040343 A1* | 2/2014 | Nickolov et al. | 709/201 |

OTHER PUBLICATIONS

About Local Notifications and Push Notifications as accessed on Jun. 26, 2013. 5 pages. http://developer.apple.com/library/ios/#documentation/NetworkingInternet/Conceptual/RemoteNotificationsPG/Introduction.html.

Android Cloud to Device Messaging Framework as accessed on Jun. 26, 2013. 9 pages. https://developers.google.com/android/c2dm/.

Push Notifications for Windows Phone dated May 31, 2013, accessed on Jun. 26, 2013. 2 pages http://msdn.microsoft.com/en-us/library/windowsphone/develop/ff402558(v=vs.105).aspx.

ComUnity: Welcomes You: Extend and Operate your business model by delivering rich application services to all mass-market mobile devices as accessed on Jun. 26, 2013. 2 pages. http://www.comunity.co.za/index.php.

European Search Report for European Application No. 13195198.0 dated Apr. 16, 2014.

* cited by examiner

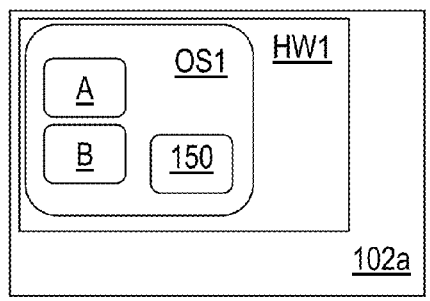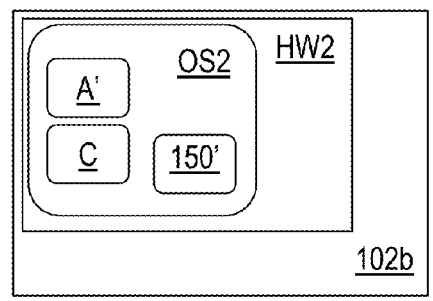
*FIG. 2*

204

User 100c
User 100b
User 100a

| Device | H/W | OS | Apps |
|--------|-----|-----|------|
| a | HW1 | OS1 | A, B |
| b | HW2 | OS2 | A, C |

User 100c
User 100b
User 100a

| Operational Objective | Class | Behavior | Value |
|---|---|---|---|
| 1 | Power | Screen timeout | Screen stays on when app active |
| 2 | Power | GPS use | Disabled by default; enabled when requested by app |
| 3 | File system | Default folder for saving documents | users\User1\documents\ |
| 4 | Output devices | Default sound | Volume at 10% |
| 5 | Credentials | Passwords | Defined as specified; auto-form fill |
| 6 | Accounts | Social Networking | Account IDs |
| 7 | Input devices | Custom keystrokes | Defined as specified |
| 8 | Doc formatting | Default font | Arial, 12pt |
| 9 | Document editing | Spelling/Grammar | Defined as specified |

| Operational Objective: Maximize energy savings ||||| 
|---|---|---|---|---|
| Functional Req. | Supported H/W | Supported OS | Supported Apps | Value |
| Screen timeout | HW1<br>HW1<br>HW1<br>HW2<br>... | OS1<br>OS2<br>OS2<br>OS1<br>... | A<br>B<br>C<br>A<br>... | 120 s<br>enable<br>300 s<br>120 s<br>... |
| GPS use | ... | ... | ... | ... |
| Wi-fi use | ... | ... | ... | ... |
| Screen brightness | ... | ... | ... | ... |
| Disk sleep | ... | ... | ... | ... |
| Auto-standby | ... | ... | ... | ... |
| Processor idle | ... | ... | ... | ... |
| Processor speed adjust | ... | ... | ... | ... |
| ... | ... | ... | ... | ... |

222

| Functionality: Set screen timeout ||||
| App | Supported H/W | Supported OS | Setting |
|---|---|---|---|
| A | HW1<br>HW1<br>HW2<br>... | OS1<br>OS2<br>OS1<br>... | Menu: Tools/Options/Advanced/... |
| B | HW1<br>HW1<br>HW2<br>... | OS1<br>OS2<br>OS1<br>... | Registry hkey=xyzabc.67657/hkhj |
| C | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

MULTI-PLATFORM OPERATIONAL OBJECTIVE CONFIGURATOR FOR COMPUTING DEVICES

FIELD OF THE INVENTION

The invention relates generally to information processing and communications technologies and, more particularly, to automated configuration of resources, such as software applications, on diverse system platforms, to institute operational objectives associated with a common user account.

BACKGROUND OF THE INVENTION

The number of personal computing devices is growing at a rate never seen before. It is estimated that in the United States, there are nearly 6 Internet-connected devices per household. These include such devices as personal computing devices, i.e., desktop or laptop personal computers, as well as more portable devices such as tablet computers and smartphones. A recent survey found that, among Internet-connected households, over 90% have 1 or more personal computers, almost 60% have one or more smartphones, and over 50% have one or more tablets.

The sheer number and diversity of personal computing devices creates myriad challenges for individuals to manage and coordinate their operability and security settings. These challenges exist even for knowledgeable users. Different devices have different hardware platforms, different operating systems, and different versions of applications. The capabilities of the user's devices for performing certain tasks is can vary from unit to unit. Also, the available features on each device can be different due to there being different software applications across the user's devices. This presents a need to separately configure applications on each device.

In the case of a security application, such as an antivirus suite of programs, for example, certain operations require more computing resources than others. Heuristic analysis of unknown programs, for instance, involves emulating program instructions of each unknown program in an isolated virtual computing environment, and analyzing the behavior of those instructions, prior to permitting execution of that unknown program. This process takes time and may not be feasible on certain types of computing platforms, e.g., smartphones, tablets, etc., that lack the processing power or memory to perform such operations. The configuration of security settings that relate to opening unknown files would therefore be different for a user's smartphone than for the same user's desktop PC, for example.

Organizations operating enterprise private networks, such as businesses, governmental organizations, etc., have policies that can be applied uniformly across all devices of a particular class, and that permit certain applications, especially security applications, to be configured in a particular way. Typically, such organizations have certain common platforms deployed with particular licensed software, which enable uniform application of security policies.

However, this level of coordination is almost always lacking for individuals or families that own multiple different devices. The challenge of separately configuring different devices is further compounded when other, often less-knowledgeable, family members, such as children, have possession of certain devices.

There is a need for an effective and efficient solution for configuring software on diverse devices.

SUMMARY OF THE INVENTION

One aspect of the invention is directed to a method for managing security application configuration settings for a plurality of diverse computing devices having independent security applications. The method includes:

hosting, via a computer-implemented configuration service, a user interface associated with a user account that facilitates selective adjustment of security functionality settings for a plurality of security objectives;

maintaining, by the configuration service, a first mapping that associates each of the security objectives with a corresponding set of tasks;

maintaining, by the configuration service, a second mapping that associates each task with different sets of security modules executable on corresponding different ones of the diverse computing devices, each of the security modules comprising instructions that, when executed according to certain operational parameter settings by its corresponding computing device, cause that computing device to perform at least a portion of the corresponding task;

maintaining, by the configuration service, an inventory of computing devices and security modules available on each of the computing devices, associated with the user account;

receiving, via the user interface, security functionality setting input defining at least one security objective to be carried out on each of the diverse computing devices;

determining, by the configuration service, based on the inventory and on the security functionality setting input, an extent to which the at least one security objective can be met by each security application of each one of the computing devices;

in response to a result of the determining being indicative of a first computing device having capability to meet the at least one security objective, generating, by the configuration service, configuration instructions particularized to the first computing device to cause the security application of the first computing device to carry out the tasks associated with the at least one security objective; and in response to a result of the determining being indicative of a second computing device lacking capability to meet one or more of the at least one security objective, indicating, by the configuration service, an exception condition.

Another aspect is directed to managing application configuration settings for a plurality of diverse computing devices having independent applications. One such method includes:

hosting, via a configuration service, a user interface associated with a user account that facilitates selective adjustment of functionality preferences defining certain behaviors adjustable in a plurality of independent applications;

maintaining, by the configuration service, an inventory of computing devices and resources available on each of the computing devices, associated with the user account;

storing, by the configuration service, a first mapping that associates user-specifiable application behavior objectives with applications having adjustable settings impacting at least a portion of each one of the user-specifiable application behavior objectives;

storing, by the configuration service, a second mapping that associates each of the applications of the first mapping with available adjustable parameters and corresponding particular behaviors;

receiving, via the user interface on the configuration service, application behavior setting input defining at least one user-specified behavior objective to be instituted on each of the diverse computing devices;

determining, by the configuration service, based on the first mapping, on the inventory, and on the application behavior setting input, applications present on computing devices for which the at least one user-specified behavior objective can be at least partially achieved;

in response to a result of the determining being indicative of a first computing device having at least one application for which the at least one user-specified behavior objective can be at least partially achieved, generating, by the configuration service, configuration instructions particularized to the first computing device to cause the first computing device to configure the at least one application to institute the at least one behavior objective based on the second mapping; and transmitting, by the configuration service, the configuration instructions for reception by a local configuration remote agent executing on the first computing device.

In another aspect of the invention, a system for managing application configuration settings for a plurality of diverse computing devices having different resources including independent applications includes a set of instructions executable by computing hardware and stored in a non-transitory storage medium that, when executed, cause the computing hardware to implement:

a user interface module that facilitates interaction with a user corresponding to a user account to accept user input for setting a specified operational objective defining certain behaviors for a plurality of applications executable on the plurality of diverse computing devices associated with the user account;

a remote agent interface module that communicates with each of the plurality of computing devices associated with the user account to obtain configuration and resource information for that computing device;

an analysis module that produces a determination of independent applications, if any, on each of the plurality of computing devices, for which the specified operational objective can be at least partially achieved, the determination being based on the user input, on the configuration and resource information for each of the plurality of computing devices, and on a predefined set of resource mappings that defines requirements for meeting various operational objectives and resources needed for meeting each of the requirements; and a device configurator module that generates configuration instructions particularized to one or more target computing devices of the plurality of computing devices in response to the determination by the analysis module being indicative that the specified operational objective can be at least partially achieved on those one or more target computing devices, wherein the configuration instructions, when executed, cause the one or more target computing devices to reconfigure their resources to operate in accordance with the operational objective.

In a further aspect of the invention, a system for managing security application configuration settings for a plurality of diverse computing devices having independent security applications includes computing hardware and instructions stored in the computing hardware, that, when executed, cause the computing hardware to implement:

a user interface module associated with a user account that facilitates selective adjustment of security functionality settings for a plurality of security objectives;

a communicative coupling to a first mapping data set that associates each of the security objectives with a corresponding set of tasks;

a communicative coupling to a second mapping data set that associates each task with different sets of security modules executable on corresponding different ones of the diverse computing devices, each of the security modules comprising instructions that, when executed according to certain operational parameter settings by its corresponding computing device, cause that computing device to perform at least a portion of the corresponding task;

an inventory module that stores an inventory of computing devices and security modules available on each of the computing devices associated with the user account;

a user specifications module that stores information defining at least one security objective to be carried out on each of the diverse computing devices;

an analysis module that determines, based on the inventory and on the information defining at least one security objective to be carried out, an extent to which the at least one security objective can be met by each security application of each one of the computing devices;

a device configurator module that generates configuration instructions in response to a result of the determining being indicative of a first computing device having capability to meet the at least one security objective, the configuration instructions being particularized to the first computing device to cause the security application of the first computing device to carry out the tasks associated with the at least one security objective; and wherein the analysis module is configured to cause the user interface module to indicate an exception condition in response to a result of the determining being indicative of a second computing device lacking capability to meet one or more of the at least one security objective.

BRIEF DESCRIPTION OF THE DRAWINGS

The invention may be more completely understood in consideration of the following detailed description of various embodiments of the invention in connection with the accompanying drawings, in which:

FIG. 2 illustrates some of the computing devices of FIG. 1 in greater detail to illustrate some of their differences.

FIG. 5 is a diagram illustrating an exemplary structure of an inventory data structure of the system depicted in FIG. 4 according to one embodiment.

FIG. 6 is a diagram illustrating an exemplary structure of user specifications data structure of the system depicted in FIG. 4 according to one embodiment.

Figure 1:
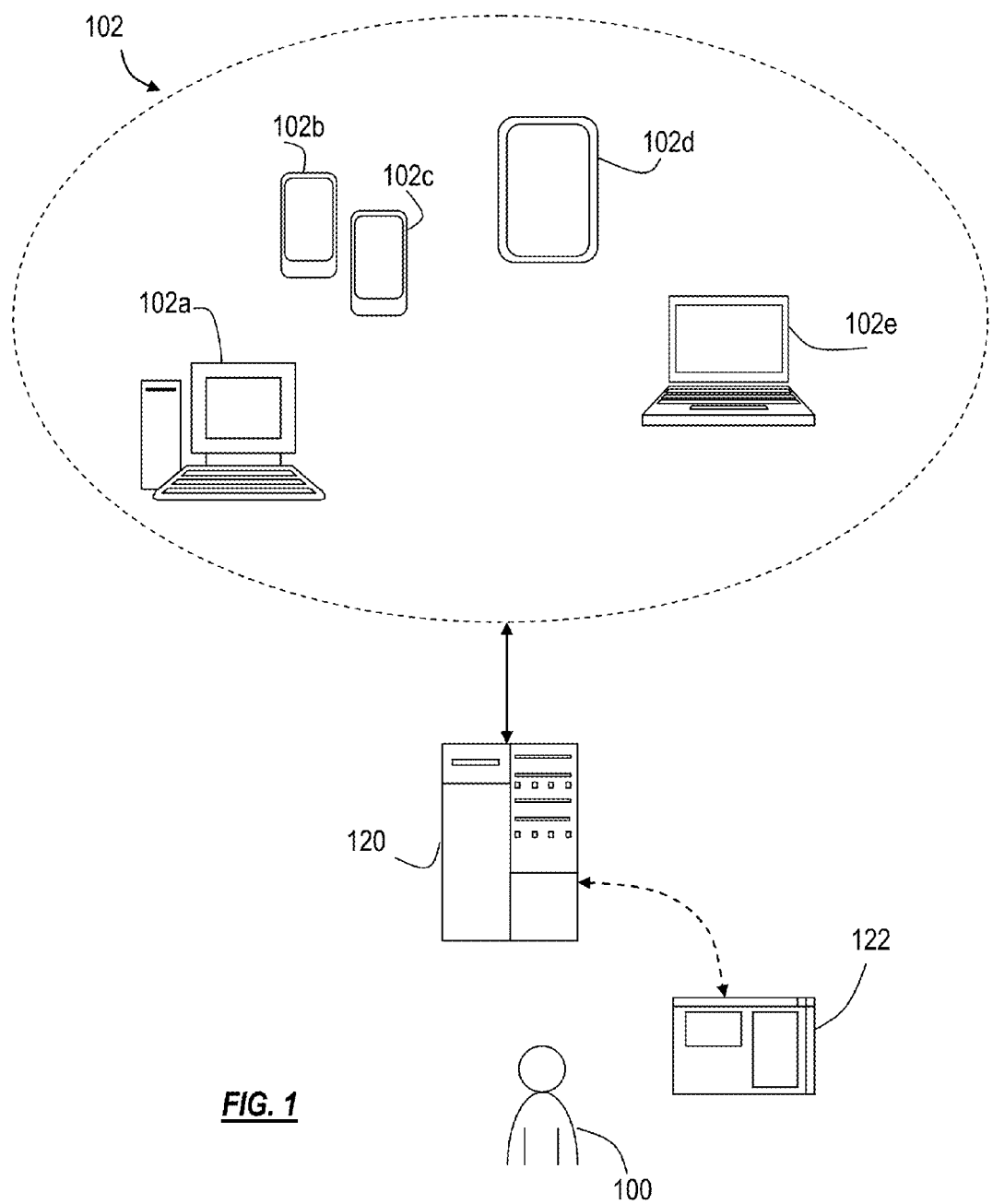
FIG. 1 is a block diagram illustrating a high-level overview of a system for configuring application settings on a group of diverse computing devices according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

One aspect of the invention facilitate centralized management of application configuration settings for a group of diverse computing devices. A related aspect of the invention is directed to managing configuration settings for security applications running on diverse computing devices.

FIG. 1 is a block diagram illustrating a high-level overview of a system for configuring application settings on a group of diverse computing devices according to one embodiment. In the exemplary scenario depicted in FIG. 1, user 100 owns or administers a group of different computing devices 102, including a desktop PC 102*a*, smartphones 102*b* and 102*c*, tablet device 102*d*, and laptop PC 102*e*. Other types of devices may also be included in the group, and there may be more or fewer ones of each type. Notably, the computing devices 102 are diverse, meaning they have differences from one another in terms of device capability and device configuration.

FIG. 2 illustrates exemplary computing devices 102*a* and 102*b* in greater detail to illustrate some of the differences. Computing device 102*a* includes hardware platform HW1, which can be a multi-core processor-based PC including a large cache, large amounts of memory, a high-speed data bus, etc. Computing device 102*b* has a different hardware platform, HW2, which tends to be oriented towards having a small form factor for increased portability, and low power consumption. Being a portable device, hardware platform HW2 of computing device 102*b* may also include features such as a global positioning system (GS) receiver, accelerometer, magnetic field sensor, etc. The devices have very different operating systems as well, with computing device 102*a* having operating system OS1, such as a Windows® operating system, and computing device 102*b* having operating system OS2, such as iOS™ or Android™Naturally, the devices will have very different applications. In this example, device 102*a* has applications A and B, while device 102*b* has applications A' and C. Applications A and A' may be similar applications from the same developer and for the same purpose, but application A' is a specially-tailored version for operating system OS2.

The functionality, configurability, and overall capability of the hardware platforms, operating systems, and applications can be dramatically different. Still, there are certain operational objectives that user 100 may wish to have consistent across devices. For instance, in the case of security applications, user 100 may want a certain security policy to be instituted across devices to the extent possible. User 100 may wish to use certain anti-spam settings, Web browsing protection, access credentials, etc., in a consistent way across devices. More generally, user 100 may wish to conduct certain secure activity using various devices, such as online financial transactions, which would require various different security functions to be enabled.

In the case of altogether different applications, user 100 may want there to be a consistent operability across many different applications on the various devices. For instance, user 100 may want to define certain custom keyboard shortcuts or key combinations, and manage them in one place for multiple different applications on some or all devices 102. User 100 may wish to implement certain power-saving policies for various classes of devices, such as portable devices smartphones 102*b* and 102*c* and tablet 102*d*. There are myriad other operational objectives, security-related, or otherwise, that are contemplated.

Accordingly, in the embodiment depicted in FIG. 1, a configuration management system 120 is provided. In one type of embodiment, configuration management system 120 is implemented as one or more computer systems having a hardware platform, an operating system, and applications installed in the operating system, for example, as detailed below with reference to FIG. 13. System 120 can be one or more servers in a client-server model, and can operate as a cloud-based service for user 100. The data processing performed by system 120 can be implemented on a single machine, on a multi-processor system, or using distributed processing, such as with the use of cluster computing techniques, for instance. Processing can also be widely distributed in a n-tier architecture, or in a peer-to-peer regime. In certain embodiments, one or more of devices 102 participates in the processing. With any of these arrangements, various modules are implemented in system 120.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software.

In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

System 120 provides a user interface 122 for user 100 in which to define the operational objectives. User interface 122 can be Web-based according to an example embodiment, in which it is accessible from any device 102, or via a separate terminal with a suitable Web browser.

System 120 provides a communication interface with each of devices 102. According to one type of embodiment, each computing device 102 runs a remote agent module 150. Remote agent module 150 facilitates the communication with system 120 from the side of each device 102.

Remote agent module 150 can be deployed in various versions that are adapted specifically for a particular operating system. As depicted in FIG. 2, device 102*b* has a remote agent module 150' that is adapted for operating system OS2 for portable devices.

Figure 3:
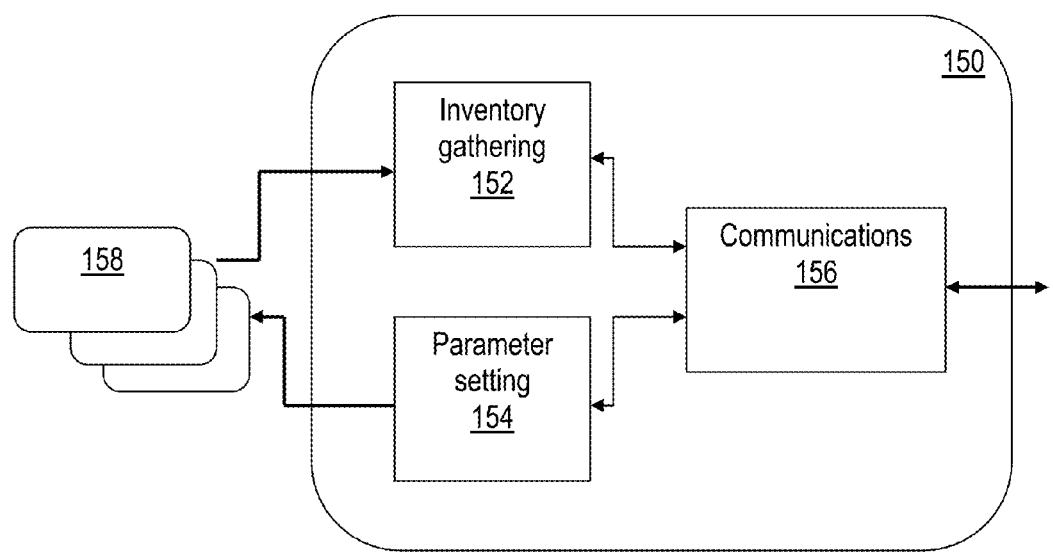
FIG. 3 is a block diagram illustrating a remote agent module that executes on the computing devices according to one embodiment.

FIG. 3 is a block diagram illustrating remote agent module 150 according to one embodiment. Remote agent module 150 includes an inventory gathering module 152, parameter setting module 154, and communications module 156. Inventory gathering module 152 is adapted to obtain information about resources 158 on the computing device. Resources 158 can include information identifying or describing the installed applications and their versions, the operating system, drivers installed in the operating system, hardware configuration, etc. Also, resources 158 can include certain data objects, such as databases, digital certificates, virtual machines, or libraries that are relevant to having the ability to carry out operational objectives that are supported by system 120. Inventory gathering module 152, in various embodiments, reads information from the operating system's registry, or performs various scans to obtain the necessary information.

Parameter setting module 154 is adapted to institute certain adjustments, or setup, of resources 158 in accordance with enabling or configuring an operational objective. In one example, parameter setting module 154 is a script execution tool that is granted sufficient permission by the operating system to effect changes to the resources 158. More generally, in one embodiment, parameter setting module 154 receives instructions and relevant parameter values for establishing some or all of the functionality needed for an operational objective.

Communications module 156 communicates with system 120 to pass inventory information gathered by inventory gathering module 152 to system 120, and to receive instructions from system 120 to pass to parameter setting module 154. The communication exchange can utilize any suitable technology such as TCP, secure tunneling via a virtual private network (VPN) protocol, etc. Communications module 156 may communicate with system 120 using a push model, where system communications module 156 initiates a message to system 120 whenever a configuration change has occurred, and where system 120 initiates a message to communications module 150 whenever new configuration instructions are generated for the computing device. In another embodiment, a pull model may be used, where one or both of the devices initiate communications according to a defined protocol periodically. In a related embodiment, a hybrid push-like model is employed where a pull model with frequent communication cycles is employed.

Figure 4:
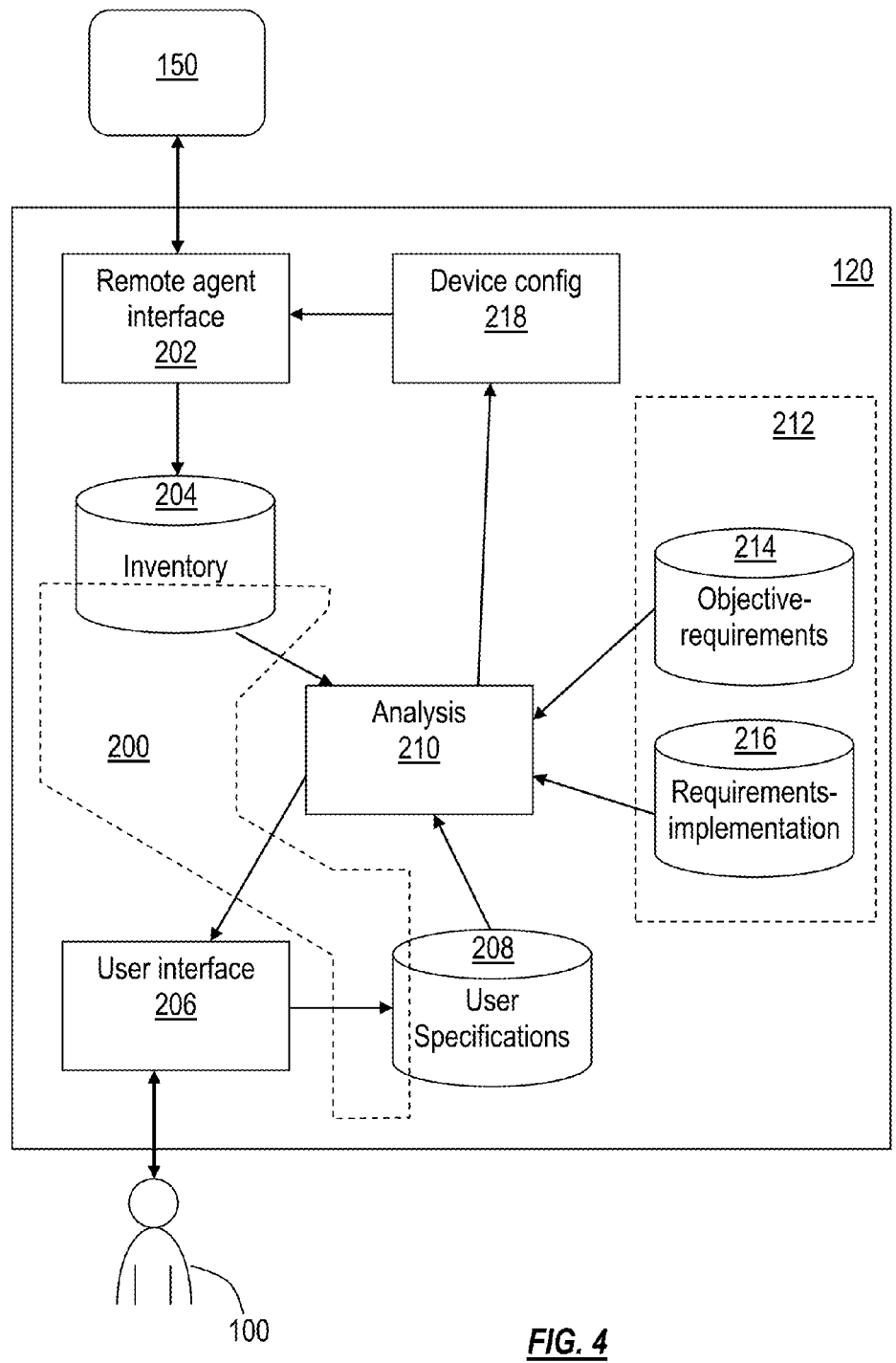
FIG. 4 is a block diagram illustrating an exemplary arrangement of modules that are implemented in a system for configuring computing devices to carry out an operational objective according to one embodiment.

FIG. 4 is a block diagram illustrating an exemplary arrangement of modules that are implemented in system 120 according to one embodiment. Remote agent interface module 202 communicates with each of the computing devices 102 associated with the user account of user 100. Remote agent interface module 202 obtains configuration and resource information for each computing device 102, and transfers configuration instructions to each computing device 102.

The configuration and resource information for each computing device 102 is stored in inventory data structure 204. In a related embodiment, inventory data structure 204 is a database that stores configuration and resource information for a plurality of different user accounts, including user account 200 corresponding to user 100.

FIG. 5 is a diagram illustrating an exemplary structure of inventory data structure 204 according to one embodiment. Different records are respectively associated with users 100*a*, 100*b*, 100*c*, etc. In each record, one or more tuples represents each of the devices associated with each user account, as well as details describing the features and configuration of each device, including information H/W about the hardware platform, operating system OS information, and information Apps about the applications present on the corresponding device.

Referring again to FIG. 4, user interface module 206 provides an interactive user interface, such as user interface 122, through which user 100 can specify operational objectives. In one embodiment, user interface module 206 includes a Web server that is accessible by any terminal with a Web browser. In a related embodiment, the operational objectives that can be specified are presented to the user using a graphical user interface (GUI), through which user 100 can select operational objectives from a prepared set, define new operational objectives, etc., and specify parameter values for each of the objectives, where such specification is relevant. Once established, each operational objective is stored in user specifications data structure 208, which can also store operational objectives from a plurality of other users in one embodiment.

FIG. 6 is a diagram illustrating an exemplary structure of user specifications data structure 208 according to one embodiment. Data structure 208 in this example includes separate records for users 100*a*, 100*b*, 100*c*, etc. In each record, one or more tuples represents one or more operational objectives specified by the user. In the example depicted, a variety of classes of operational objectives can be managed. For instance, operational objectives relating to power management (objectives 1-2), file system use (objective 3), output devices (objective 4), access credentials such as passwords (objective 5), user accounts (objective 6), input devices (objective 7), document formatting (objective 8), and document editing (objective 9) may be specified. For each operational objective, a behavior is defined, and values of settable parameters are stored. The operational objectives may apply to a particular application or suite of applications, or may apply to all configurable applications across the board.

Analysis module 210 obtains the inventory and user specification information, and produces a determination of which applications (if any) on each of the computing devices 102 should be configured to at least partially achieve the specified operational objectives. Certain embodiments require the operational objective to be achievable prior to taking action to institute those objectives. In another embodiment, analysis module determines an extent to which the operational objectives can be achieved and, if they cannot be fully achieved, authorization is sought from user 100 to partially implement the objectives.

According to some embodiments, the determination of which applications can be configured is based on the user input stored in user specifications data structure 208, on the configuration and resource information for each of the computing devices 102, as stored in inventory data structure 204, and on a predefined set of resource mappings 212. The set of resource mappings 212 defines requirements for meeting various operational objectives and resources needed for meeting each of the requirements.

Figure 7:
FIG. 7 is a diagram illustrating an exemplary data structure and partial content for and operational objective-resource mapping according to one embodiment.

FIG. 7 is a diagram illustrating an exemplary data structure and partial content for operational objective-resource mapping 220. In this example, the portion of mapping 220 as depicted corresponds to a single operational objective, namely, maximization of energy savings. In mapping 220, a set of functional requirements is provided, including screen timeout function, GPS use setting, Wi-Fi radio use setting, screen brightness setting, disk sleep setting, auto-standby setting, processor idle behavior setting, processor speed adjustment setting, and others. For each functionality requirement, a separate set of resources is identified that supports the function. For example, hardware platforms, operating systems, and applications. Also, parameter values are provided for each supported resource to implement the functionality. The required resource mappings can be looked up in mapping 220 based on the operational objective specified by the user.

Figure 8:
FIG. 8 illustrates an exemplary functionality-implementation mapping according to one embodiment.

FIG. 8 illustrates an exemplary functionality-implementation mapping 222 relating to the screen timeout function. For each application and supported hardware and operating system platforms, where relevant, settings are indicated for how to make the necessary settings or adjustments to implement the function. As illustrated, for application A, there is a menu setting relating to screen timeout behavior. For application B, the setting resides in the operating system's registry. In this example, mappings 220 and 222 must be traversed in order to build a configuration instruction for establishing a specified operability objective in each device. Notably, for different resource combinations of the different computing devices 102, there may be differing implementation settings to achieve essentially the same or similar operability objectives.

In a related embodiment, a series of mappings is used to obtain the resources needed for making the determination of which devices, and which applications, the operability objective can be achieved. For example, in one approach, analysis module 210 first generates a set of functionality requirements particularized to the specified operational objective. For instance, in objective-functionality requirements mapping 214, there is an association various operational objectives with functionality requirements for carrying out each of the various operational objectives. The user-specified operational objective is looked up in mapping 214, and the functionality requirements needed to implement each of the operational objectives is retrieved.

In this example, the analysis module then generates a set of resource requirements particularized to the operational objective based on functionality requirements-implementation mapping 216, in which various functionality requirements are associated with resource requirements needed for implementing each of the various functionality requirements. The use of the first mapping, and then the second mapping provides a process in which every possible operational objective (of which there can be a large, unwieldy, number) does not need to be directly associated with resource requirements a priori. Instead, operational objectives need only be associated with functionality requirements. It is likewise simpler to associate required resources with functionalities, rather than with operational objectives.

In various embodiments, the predefined set of resource mappings 212, in various embodiments, can have more or fewer data structures representing different mappings that ultimately lead to a determination of the resource requirements for a given operational objective. The set of resource mappings 212 can be hosted by system 120, or remotely on a distinct system that is communicatively coupled to system 120.

Analysis module 210 compares the set of resource requirements determined particularly for the specified operational objective stored in user specifications data structure 208 with the configuration and resource information from each computing devices 102, as maintained in inventory data structure 204 to produce an indication of one or more target computing devices on which the specified operational objective can be at least partially achieved.

This information is passed to device configurator module 218, which generates configuration instructions particularized each computing device 102, where such configuration is possible or authorized. In one embodiment, the configuration instructions are in the form of a generated script that, when executed by parameter setting module 154 of remote agent 150, cause remote agent 150 to reconfigure the resources 158 of the corresponding computing device 102 to operate in accordance with the operational objective(s). When there are multiple operational objectives to be implemented, a single instruction set or script can include different instructions for implementing the different operational objectives. Accordingly, in a related embodiment, device configurator module 218 generates a different script for each computing device 102, since there may be varying capabilities among computing devices for achieving the various operational objectives.

In one embodiment, the instructions are generated in response to the determination by analysis module 210 indicating that the specified operational objective can be at least partially achieved. In one such embodiment, the configuration instructions are automatically generated for a given computing device only when it is determined that the operational objective can be fully achieved. In a related embodiment, if it is determined that an operational objective can be achieved only partially, an exception is indicated to the user via user interface 206. The exception indication can indicate the limitation of the extent to which the operational objective can be partially implemented, and the user may be given the option to authorize the partial implementation.

In one type of embodiment, user specifications data structure 208 contains all of the user-specifiable settings or parameters for a given application. Thus, the operational objectives in this case, as a whole, represent an entire set of configurability for part of a computing device.

Figure 9:
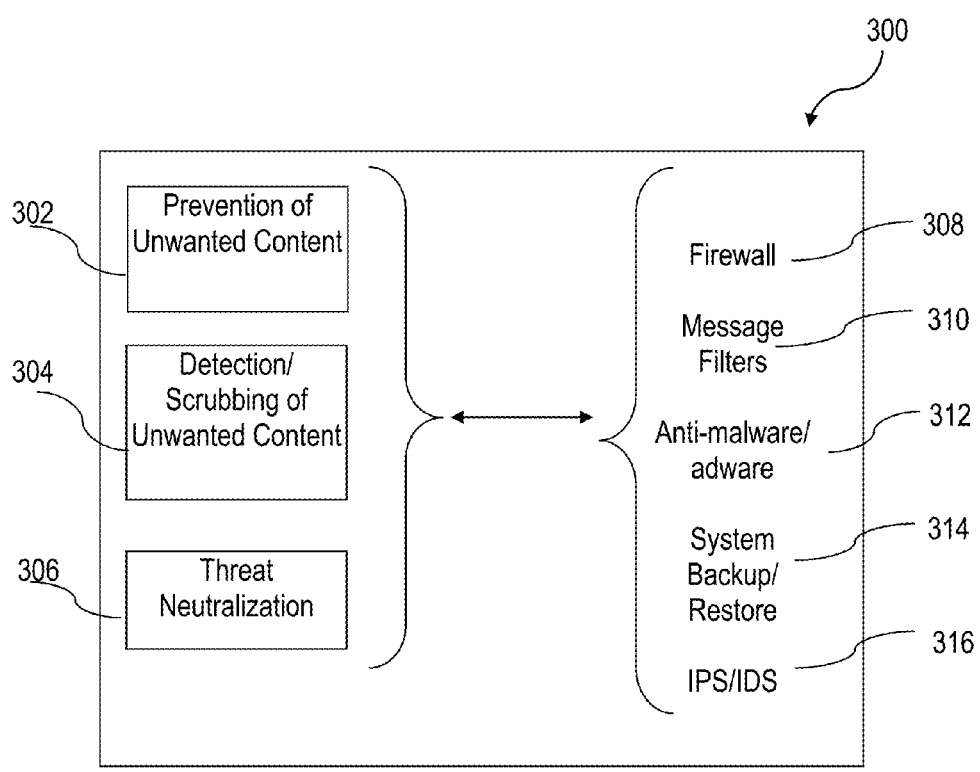
FIG. 9 is a diagram of a local security application that runs on a computing device according to one aspect of the invention.

In one type of embodiment, the configuration of computing devices 102 is specific to configuring security applications. FIG. 9 is a diagram of a local security application 300 that runs on a computing device according to one aspect of the invention. Security application 300 performs any combination of one or more security-related functions, such as prevention of unwanted content 302, detection/scrubbing of unwanted content 304, and threat neutralization 306. These security-related functions are described below only generally, by way of illustration, and are not intended to be a required or exhaustive list of security functions that are contemplated. A variety of other security-related functions can be present in addition to, or in place of, any of the functions exemplified herein.

Prevention of unwanted content 302 includes blocking unwanted content, such as viruses, worms, and other malware, adware, spyware, spam, and the like, as well as undesired data traffic, such as hacker attacks, before any of these threats or programs can be placed on the local device. Typically, this function involves blocking or diverting of content or data traffic at a firewall. Detection/scrubbing of unwanted content 304 would apply to content that may have penetrated the prevention function, and now resides in some form on the local device. A typical example of this functionality would include scanning for viruses based on a database of virus definitions, and removing or quarantining those program instructions or associated data. Threat neutralization 306 applies to detected unwanted content or detected attacks or threats in progress, and involves taking action to terminate any suspect programs or processes, stop network traffic, and restore the system to a previous known safe state.

Security module 300 includes a variety of components, such as, for example, firewall 308, message filters 310, anti-malware/adware blocking/removal tool 312, system backup/restore utility 314, and intrusion prevention or detection system (IPS/IDS) 316. These components can work in different combinations to achieve the various functions of security module 300.

In one embodiment, security application 300 facilitates configurability of its functions. For example, one type of configurability is the ability to selectively turn individual components or functions on or off. Another type of configurability is the ability to dynamically adjust the operation of individual functions or components. For example, operational settings of firewall 308 or IPS/IDS 316 can be adjusted in one embodiment to set a level of protection to be more or less aggressive, based on the needs of the operator or of the system.

In another example, anti-malware/adware component 312 is adjustable. Anti-malware/adware component 312 has a database of known threat definitions, which it uses to scan the data store for the presence of any known threats. In one embodiment, the threat definitions database can be limited or expanded with additional threat definitions, based on the system or user needs.

System 120 enables user 100 to avoid having to perform setup of separate applications or security services on each device 102 in order to perform a security task; the user simply determines, in a centralized manner while interacting with system 120, how he or she wants to perform the task, and system 120 generates the configuration instructions on the various devices 102 that correspond to the task.

Figure 10:
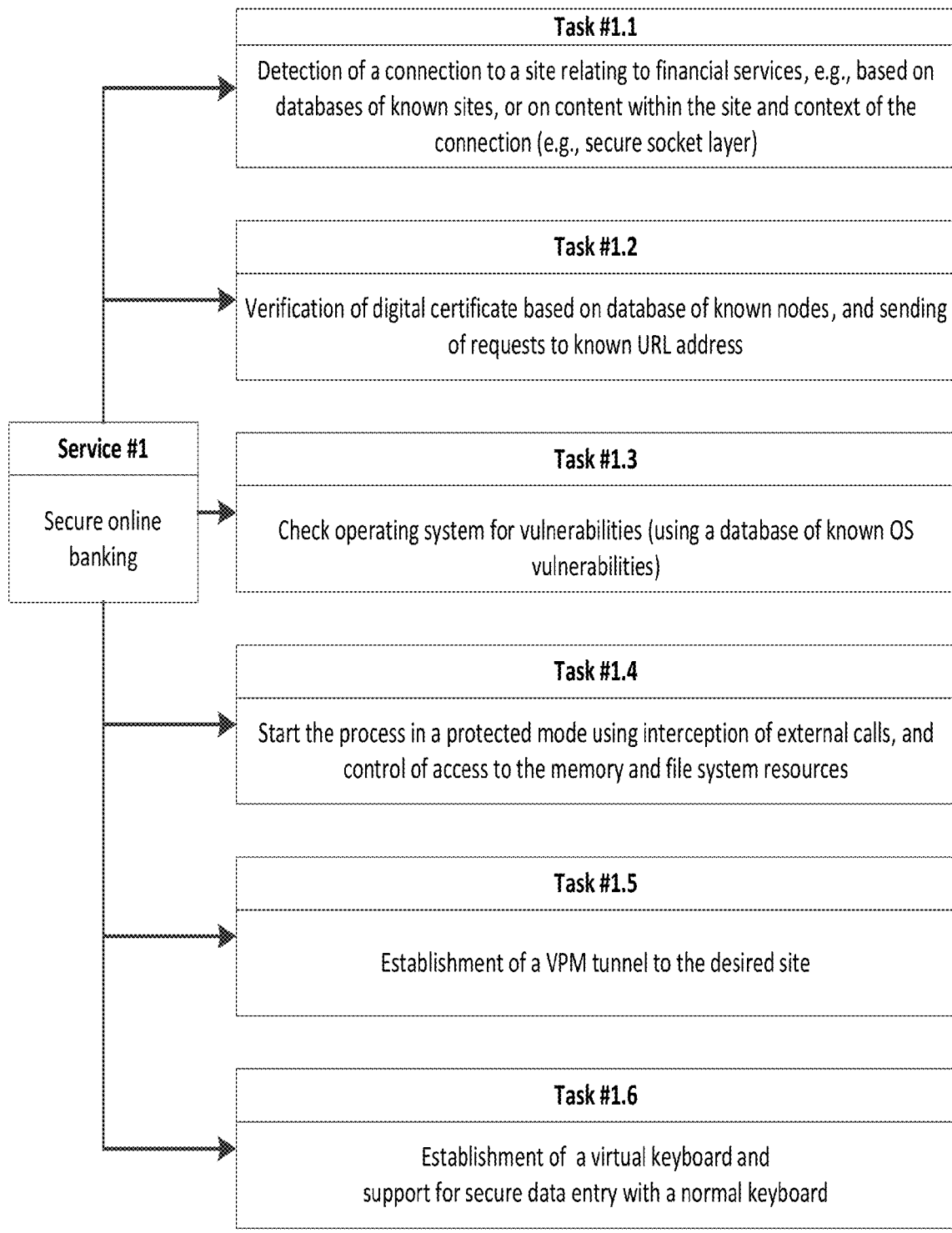
FIG. 10 is a diagram illustrating an exemplary security objective relating to online banking security according to one embodiment.

FIG. 10 is a diagram illustrating an exemplary security objective relating to online banking security according to one embodiment. A security service #1, i.e., secure online banking, is specified as the operational objective. This objective is mapped to security tasks 1.1-1.6. Tasks For 1.1 to 1.3 involve maintaining and synchronizing relevant databases and lists. Task 1.4 involves the use of a protected mode, which may not be feasible on portable devices such as smartphones due to their limited computing capabilities. Task 1.5 relates to operations for establishing a secure tunnel to the banking site, and task 1.6 involves the implementation of a virtual keyboard. For these tasks, the various devices 102 may have different modules, perhaps even different modules from different software developers for carrying out the associated operations. Hence, there is a need for individualized configuration of the various security tools. If certain functionality is determined to be insufficient or unavailable by analysis module 210, then an exception is indicated.

In a related embodiment, in response to an exception determination that the operational objective can be only partially implemented, or not at all, an instruction is nonetheless generated for the computing device 102 to obtain the resources necessary to implement the functionality. These resources may be obtained from a third party source by the computing device 102, or by system 120, which then configures an installation package for the computing device 102.

This authorization can be important for configuring security applications, since the user may limit their use of a given computing device if they are made aware of limitations in data or identity protection capabilities of that device. Still, other functionality to provide as much protection as possible is still desirable, even though it may fall short of the ideal, complete, objective.

In another embodiment, in response to the exception condition, the configurator module 218 generates configuration instructions particularized to the computing device to limit functionality of one or more software applications that represents a risk attributable to the lack of capability of that computing device to achieve the security objective.

Figure 11:
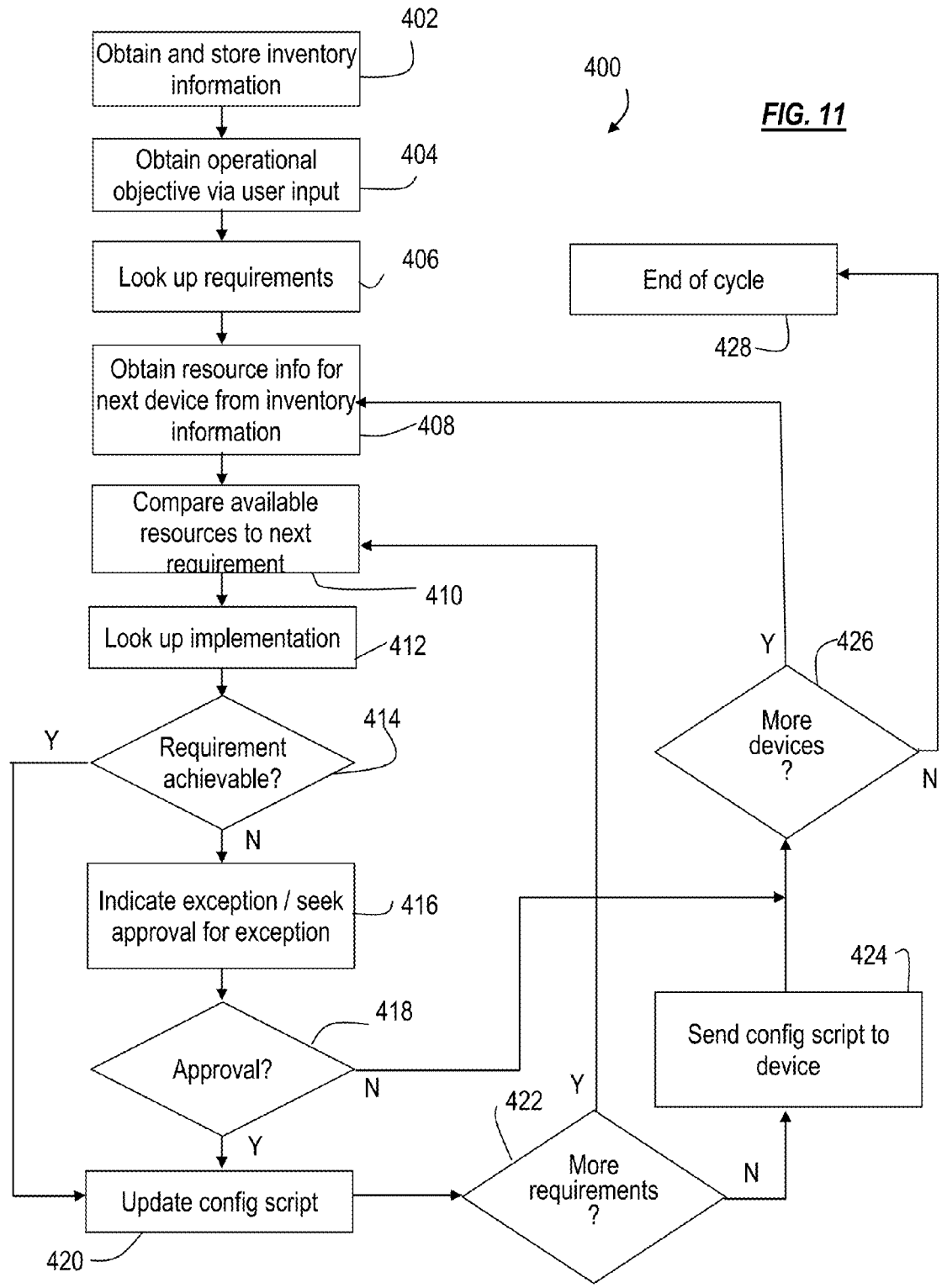
FIG. 11 is a flow diagram illustrating a process carried out by the system depicted in FIG. 4 according to one embodiment.

FIG. 11 is a flow diagram illustrating a process 400 carried out by system 120 according to one embodiment. Process 400 in this example is a computing device review and configuration script update cycle. At 402, inventory information from each of the computing devices 102 is obtained and stored. A 404, user input is obtained via the user interface that provides the operational objective(s). At 406, system 120 looks up the functionality and resource requirements corresponding to the first operational objective. These requirements can include the set of tasks corresponding to a security service, as described above with reference to FIG. 10.

At 408, the available resources of a computing device 102 are retrieved from the stored inventory information and, at 410, this information is compared against the functionality and resource requirement looked up for the specified operational objective. At 412, implementation details are looked up for the requirement. Based on this information, a determination is made at 414 as to whether the functionality and resource requirements are achievable with the computing device 102 being examined. If so, the configuration script is updated to institute the operational objective. If not, then at 416, an exception is indicated. The exception may be indicated to the user via the user interface, or it may be handled internally in system 120 (e.g., the system may automatically obtain components or resources necessary for carrying out the full objective). There may be a combination of these responses to an exception: there may be additional software needed, but the user may need to be notified, or approval may be needed. Alternatively, the user may need to be notified that the full operational objective cannot be met, and approval or acknowledgement is to be obtained from the user. In this case, at 416, approval is sought and, if received at 418, the configuration script is updated accordingly. If the approval is not obtained, the process branches to decision 426, which determines if there is another computing device to be addressed.

Next at 422, a determination is made if there are additional requirements to be met for the operational objectives. If there are, the process branches to 410 to check whether the next requirement can be met. If all of the requirements have been evaluated, the process causes system 120 to send the configuration script to the computing device at 424. and decision 426 is made regarding remaining computing devices. If all computing devices have been addressed, the cycle ends at 428.

Figure 12:
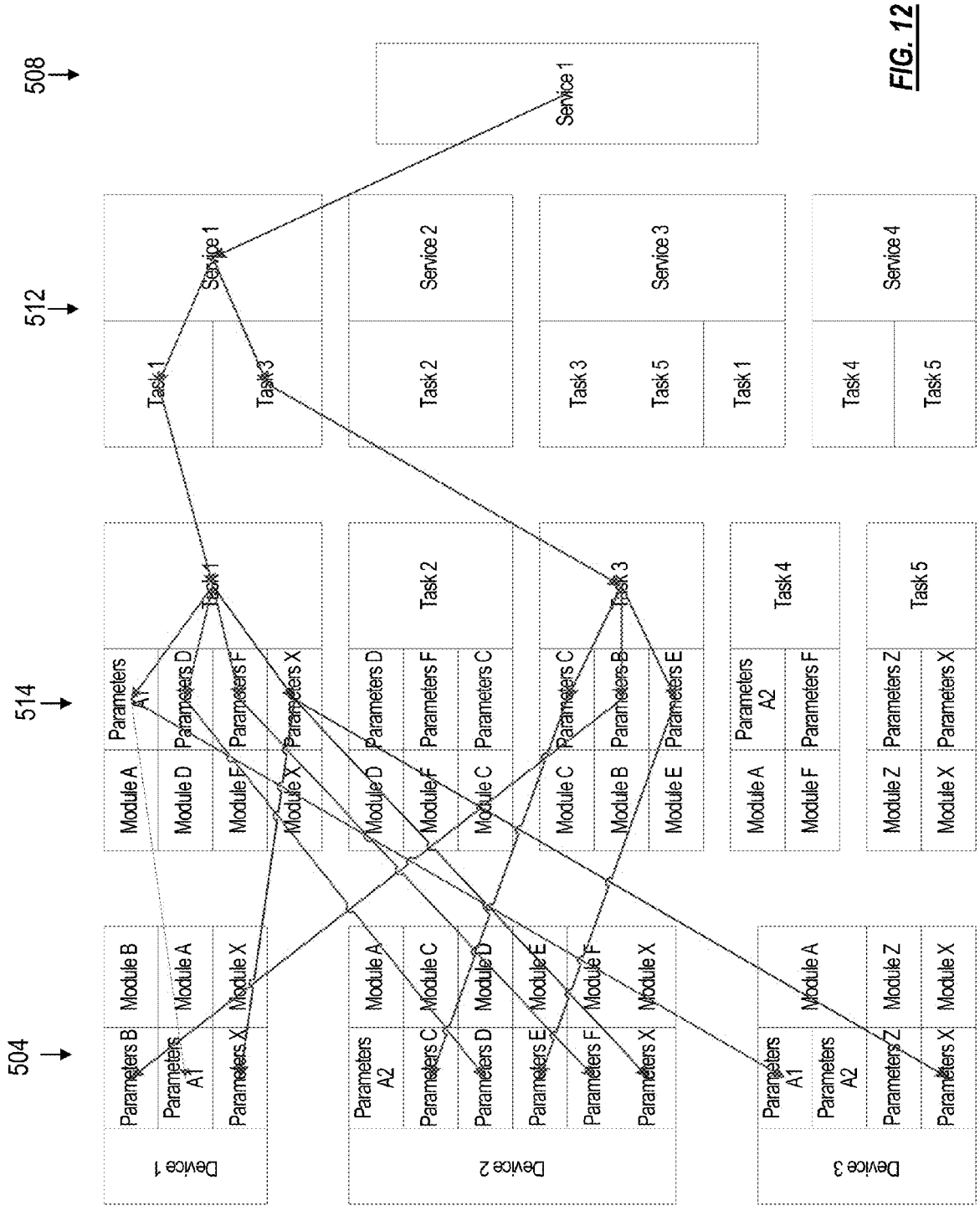
FIG. 12 is a diagram illustrating a multi-level lookup process for determining which devices can be configured to carry out an operational objective that is a particular service indicated as a service according to one embodiment.

FIG. 12 is a diagram illustrating a multi-level lookup process according to one embodiment for determining which devices can be configured to carry out an operational objective that is a particular service indicated as service1. At 504, inventory information for computing device device1, device2, and device3 is obtained. At this point it is known which operational modules are available on each device. At 508, service1 is specified as the operational objective of this example. At this point, it is unclear which device can carry out service1.

At 512, a first mapping is consulted. The first mapping associates different services with required functionality, or tasks, in this example. Here, service1 requires task1 and task3. It is still not known which devices can carry out which task. Accordingly, at 514, a second mapping is consulted. The second mapping associates various tasks with required modules and parameter settings for carrying out each of the tasks. Thus, it becomes apparent which devices can perform which tasks. In this example, task1 requires moduleA, moduleD, module F, and moduleX, with the specified parameter settings. Likewise, task3 requires moduleC, moduleB, and module E, with their corresponding parameter settings as indicated.

Based on this information, it can be seen in this example that no single computing device can perform either task completely. For task1, device1 lacks modules moduleD and module; device2 lacks an ability to configure parametersA1 even though moduleA is available with different parameters; and device3 lacks moduleD and moduleF. For task3, device1 lacks moduleC and moduleE; device2 lacks moduleB, and device3 lacks all three modules needed for task3. Thus, according to one embodiment, an exception is indicated for each device.

In a related embodiment, in response to the exception, the computing devices are instructed to exchange modules, if possible, i.e., to share copies of modules missing from other devices. In another embodiment, the computing devices are instructed to delegate certain operations to other devices deemed capable of performing them. In another embodiment, the user is notified of the deficiencies, and is given the opportunity to approve partial implementation of Service1. In yet another embodiment, the system is configured to automatically allow partial implementation of certain services; thus, the system proceeds to configure each device to the best of its ability.

Figure 13:
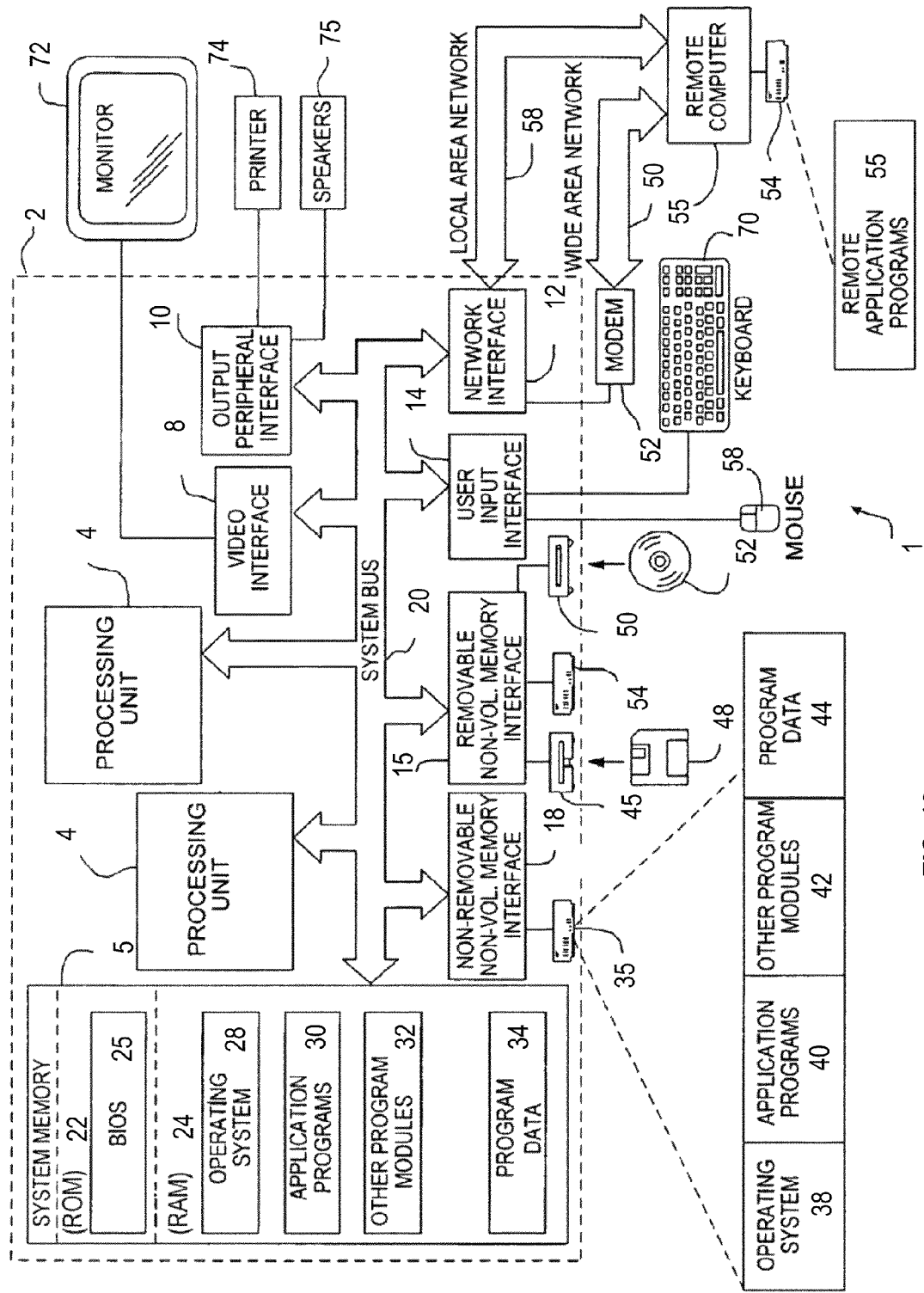
FIG. 13 is a block diagram illustrating an example of a general-purpose computer system on which aspects of the invention may be carried out.

FIG. 13 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

FIG. 13 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for managing security application configuration settings for a plurality of diverse computing devices having independent security applications, the method comprising:

hosting, via a computer-implemented configuration service, a user interface associated with a user account that facilitates selective adjustment of security functionality settings for a plurality of security objectives;

maintaining, by the computer-implemented configuration service, a first mapping that associates each of the security objectives with a corresponding set of tasks;

maintaining, by the computer-implemented configuration service, a second mapping that associates each task with different sets of security modules executable on corresponding different ones of the diverse computing devices, each of the security modules comprising instructions that, when executed according to certain operational parameter settings by its corresponding computing device, cause that computing device to perform at least a portion of the corresponding task;

maintaining, by the computer-implemented configuration service, an inventory of computing devices and security modules available on each of the computing devices, associated with the user account;

receiving, via the user interface, security functionality setting input defining at least one security objective to be carried out on each of the diverse computing devices;

determining, by the computer-implemented configuration service, based on the inventory and on the security functionality setting input, an extent to which each independent security application of each one of the computing devices has a capability to meet the at least one security objective;

in response to a result of the determining being indicative of a first computing device having capability to meet the at least one security objective, generating, by the configuration service, configuration instructions particularized to the first computing device to cause a first security application of the first computing device to carry out the tasks associated with the at least one security objective; and in response to a result of the determining being indicative of a second computing device lacking capability to meet one or more of the at least one security objective, indicating, by the configuration service, an exception condition.

2. The method of claim 1, wherein indicating the exception condition includes providing a notification to a user, via the user interface, that the second computing device is not fully configurable for the at least one security objective.

3. The method of claim 2, wherein indicating the exception condition further includes soliciting user authorization to obtain at least one additional security application component to increase the capability of the second computing device to carry out tasks associated with the at least one security objective.

4. The method of claim 1, further comprising:

in response to the exception condition, generating, by the computer-implemented configuration service, configuration instructions particularized to the second computing device to cause a second security application of the second computing device to carry out a reduced set of tasks associated with the at least one security objective for which the second computing device lacks a capability to meet.

5. The method of claim 1, further comprising:

in response to the exception condition, generating, by the computer-implemented configuration service, configuration instructions particularized to the second computing device to cause a second security application of the second computing device to limit functionality of at least one software application that represents a risk attributable to the lack of capability of the second computing device to meet the at least one security objective.

6. The method of claim 1, further comprising:

in response to the exception condition, assessing, by the computer-implemented configuration service, an extent to which a second security application of the second computing device is able to partially carry out tasks associated with the one or more security objective for which the second computing device lacks a capability to meet fully.

7. The method of claim 1, further comprising:

transmitting the configuration instructions particularized to the first computing device for reception by a local configuration remote agent executing on the first computing device.

8. The method of claim 1, wherein in generating the configuration instructions particularized to the first computing device, the configuration instructions include configuration parameters and specific values thereof.

9. The method of claim 1, wherein in generating the configuration instructions particularized to the first computing device, the configuration instructions include a specific configuration script executable on the first computing device.

10. A method for managing application configuration settings for a plurality of diverse computing devices having independent applications, the method comprising:

hosting, via a configuration service, a user interface associated with a user account that facilitates selective adjustment of functionality preferences defining certain behaviors adjustable in a plurality of independent applications;

maintaining, by the configuration service, an inventory of computing devices and resources available on each of the computing devices, associated with the user account;

storing, by the configuration service, a first mapping that associates user-specifiable application behavior objectives with applications having adjustable settings impacting at least a portion of each one of the user-specifiable application behavior objectives;

storing, by the configuration service, a second mapping that associates each of the applications of the first mapping with available adjustable parameters and corresponding particular behaviors;

receiving, via the user interface on the configuration service, application behavior setting input defining at least one user-specified behavior objective to be instituted on each of the plurality of diverse computing devices;

determining, by the configuration service, based on the first mapping, on the inventory, and on the application behavior setting input, applications present on computing devices having a capability to at least partially achieve for which the at least one user-specified behavior objective;

in response to a result of the determining being indicative of a first computing device having at least one application with the capability to at least partially achieve at least one user-specified behavior objective, generating, by the configuration service, configuration instructions particularized to the first computing device to cause the first computing device to configure the at least one application to institute the at least one user-specified behavior objective based on the second mapping; and transmitting, by the configuration service, the configuration instructions for reception by a local configuration remote agent executing on the first computing device.

11. The method of claim 10, further comprising:

determining, by the configuration service, based on the inventory and on the application behavior setting input, an extent to which each independent application of each one of the plurality of diverse computing devices has a respective capability to achieve the at least one user-specified behavior objective; and providing a notification to a user, via the user interface, of an extent to which each independent application has the respective capability to achieve the at least one user-specified behavior objective.

12. The method of claim 10, wherein in generating the configuration instructions, the configuration instructions include configuration parameters and specific values thereof.

13. The method of claim 10, wherein in generating the configuration instructions, the configuration instructions include a specific configuration script executable on the first computing device.

14. A system for managing application configuration settings for a plurality of diverse computing devices having different resources including independent applications, the system comprising:

set of instructions executable by computing hardware and stored in a non-transitory storage medium that, when executed, cause the computing hardware to implement:

a user interface module that facilitates interaction with a user corresponding to a user account to accept user input for setting a specified operational objective defining certain behaviors for a plurality of applications executable on the plurality of diverse computing devices associated with the user account;

a remote agent interface module that communicates with each of the plurality of diverse computing devices associated with the user account to obtain configuration and resource information for that computing device;

an analysis module that produces a determination of independent applications, if any, on each of the plurality of computing devices, which are capable to at least partially achieve the specified operational objective the determination being based on the user input, on the configuration and resource information for each of the plurality of computing devices, and on a predefined set of resource mappings that defines requirements for meeting various operational objectives and resources needed for meeting each of the requirements; and a device configurator module that generates configuration instructions particularized to one or more target computing devices of the plurality of diverse computing devices in response to the determination by the analysis module being indicative that the one or more target computing devices can at least partially achieve the specified operational objective, wherein the configuration instructions, when executed, cause the one or more target computing devices to reconfigure their resources to operate in accordance with the specified operational objective.

15. The system of claim 14, wherein the different resources include security applications, wherein the specified operational objective is a security objective, and wherein the requirements for meeting various operational objectives are security tasks.

16. The system of claim 14, wherein the analysis module is adapted to:

generate a set of functionality requirements particularized to the specified operational objective based on a predefined first mapping of the resource mappings that associates the various operational objectives with functionality requirements for carrying out each of the various operational objectives; and generate a set of resource requirements particularized to the specified operational objective based on a predefined second mapping of the resource mappings that associates various functionality requirements with resource requirements for implementing each of the various functionality requirements; and compare the set of resource requirements particularized to the specified operational objective with the configuration and resource information of each of the plurality of diverse computing devices to produce an indication of one or more target computing devices having the capability to at least partially achieve on which the specified operational objective.

17. The system of claim 16, further comprising:

a first mapping module that maintains the predefined first mapping in a data structure stored in a non-transitory storage medium; and a second mapping module that maintains the predefined second mapping in a data structure stored in a non-transitory storage medium.

18. The system of claim 14, further comprising:

a user account module that maintains, in a non-transitory storage medium:

an inventory data structure that stores an inventory of the configuration and resource information for each one of the plurality of diverse computing devices associated with the user account; and a user specifications data structure that stores a set of user-specified operational objectives corresponding to the user account.

19. The system of claim 14, wherein the analysis module is adapted to provide, via the user interface module, a notification to a user of an exception determination in response to a determination that at least one limited computing device lacks resources to fully implement the specified operational objective.

20. The system of claim 19, wherein the analysis module is adapted to solicit, via the user interface module, an approval for partially implementing the specified operational objective in response to an exception determination.

21. The system of claim 19, wherein the device configurator module is adapted to generate exception configuration instructions in response to an exception determination, the exception configuration instructions, when executed, cause the at least one limited computing devices to reconfigure its resources to operate partially in accordance with the operational objective.

22. A system for managing security application configuration settings for a plurality of diverse computing devices having independent security applications, the system comprising computing hardware and instructions stored in the computing hardware, that, when executed, cause the computing hardware to implement:
- a user interface module associated with a user account that facilitates selective adjustment of security functionality settings for a plurality of security objectives;
- a communicative coupling to a first mapping data set that associates each of the plurality of security objectives with a corresponding set of tasks;
    - a communicative coupling to a second mapping data set that associates each task with different sets of security modules executable on corresponding different ones of the plurality of diverse computing devices, each of the security modules comprising instructions that, when executed according to certain operational parameter settings by its corresponding computing device, cause that computing device to perform at least a portion of the corresponding task;
- an inventory module that stores an inventory of computing devices and security modules available on each of the plurality of diverse computing devices associated with the user account;
- a user specifications module that stores information defining at least one security objective to be carried out on each of the plurality of diverse computing devices;
- an analysis module that determines, based on the inventory and on the information defining at least one security objective to be carried out, an extent to which each of the independent security application of each one of the plurality of diverse computing devices is capable of meeting the at least one security objective;
- a device configurator module that generates configuration instructions in response to a result of the determining being indicative of a first computing device having capability to meet the at least one security objective, the configuration instructions being particularized to the first computing device to cause a security application of the first computing device to carry out the tasks associated with the at least one security objective; and wherein the analysis module is configured to cause the user interface module to indicate an exception condition in response to a result of the determining being indicative of a second computing device lacking capability to meet one or more of the at least one security objective.

* * * * *